3,068,255
PROCESS FOR THE PRODUCTION OF NOVEL CYCLOPENTENYL ETHERS OF EPOXIDIZED VEGETABLE OILS
Erich Marcus and John T. Fitzpatrick, Charleston, W. Va., assignors to Union Carbide Corporation, a corporation of New York
No Drawing. Filed May 25, 1961, Ser. No. 112,538
19 Claims. (Cl. 260—408)

This invention relates to a novel process for the production of cyclopentenyl ethers of epoxidized vegetable oils by the reaction of an epoxidized vegetable oil with a 3-halocyclopentene.

In another aspect, this invention relates to novel cyclopentenyl ethers of epoxidized vegetable oils.

The novel process of this invention is carried out by reacting a 3-halocyclopentene with an epoxidized vegetable oil in the presence of a Friedel-Crafts catalyst. The 3-halocyclopentene which can be used in the novel process of this invention can be represented by the following general formula:

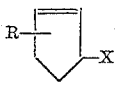

wherein X represents chlorine and bromine and R represents hydrogen or an alkyl group of from 1-8 carbon atoms. As illustrations of the 3-halocyclopentenes which are operable in the process of this invention, one can include 3-chlorocyclopentene, 3-bromocyclopentene, and alkyl substituted bromo- or chlorocyclopentenes wherein the alkyl substituents can be methyl, ethyl, propyl, octyl, etc. It is to be pointed out that neither the particular alkyl substituent within the limits set forth nor its particular position on the cyclopentene ring is critical. Thus, the 3-halocyclopentene can be an isomeric mixture having an alkyl substituent in several positions.

The epoxidized vegetable oils which are operable in the novel process of this invention are well known in the art and have been prepared in various ways. One of the most common methods of preparing said epoxidized oils is to treat a vegetable oil with an epoxidizing agent, i.e., peracetic acid, until the desired amount of epoxidation occurs. Examples of said epoxidized vegetable oils, as well as processes for their preparation, are disclosed in U.S. Patents 2,488,484; 2,485,160; 2,556,145; 2,559,177; 2,569,502 and 2,822,368.

Examples of vegetable oils which are operable in the novel process of this invention include epoxidized soybean, corn, cottonseed, safflower, sunflower, sesame, poppyseed, walnut and peanut oils.

The particular oxirane-oxygen content and degree of unsaturation of the epoxidized vegetable oils are far from being critical. Epoxidized vegetable oils which have an oxirane-oxygen content of from about 2 percent to about 12 percent, and an iodine value of from about 0 to about 10 are operable. It is preferred to employ epoxidized vegetable oils which have an oxirane-oxygen content of from 3 to 8 and an iodine number of from 0 to 2.

As has heretofore been pointed out, the novel process of our invention is carried out by reacting an epoxidized vegetable oil with a 3-halocyclopentene in the presence of a Friedel-Crafts catalyst. As examples of Friedel-Crafts catalysts which are operable, one can include zinc chloride, mercuric chloride, zinc bromide, stannic chloride, aluminum chloride and boron trifluoride. The preferred catalyst is zinc chloride. The amount of catalyst employed is not narrowly critical and can vary over a wide range. Catalyst concentrations as low as 5/100 of a percent to as high as 10 percent by weight based on the amount of 3-halocyclopentene are operable. However, it is preferred to employ 1/10 to 5 percent by weight based on the weight of 3-halocyclopentene.

The temperature at which the process is carried out is also not narrowly critical and temperatures of from $-80$ to $+80°$ C. are operable. However, it is preferred to conduct the process at temperatures in the range of $-40$ to $+40°$ C.

The molar ratio of the epoxidized vegetable oil to the 3-halocyclopentene is far from being critical, though it is preferred to use 1 mol of 3-halocyclopentene for each epoxy group in the vegetable oil.

The order of addition of reactants is also not critical and is a matter of choice, but it is preferred to gradually add one reactant to the other since the progress of the reaction can be better controlled. It is also pointed out that a solvent is not necessary although any solvent which is inert to the reactants and reaction product under the conditions specified can be employed. Examples of such solvents include petroleum ether, ethyl ether, chloroform, benzene, and ethyl acetate.

In another aspect, this invention relates to novel cyclopentenyl ethers which are products resulting from the novel process of this invention. At the outset, it is pointed out that the novel cyclopentenyl ethers are mixtures of various isomeric forms, the complete nature of which or the distribution of which in the product, has not been completely determined.

In order to aid in understanding the various products which can result from the novel process of this invention, the following reaction scheme is presented employing epoxidized soybean oil and 3-chlorocyclopentene. The purpose of the reaction scheme is to graphically depict the attachment of the cyclopentenyl ring to the epoxidized vegetable oil.

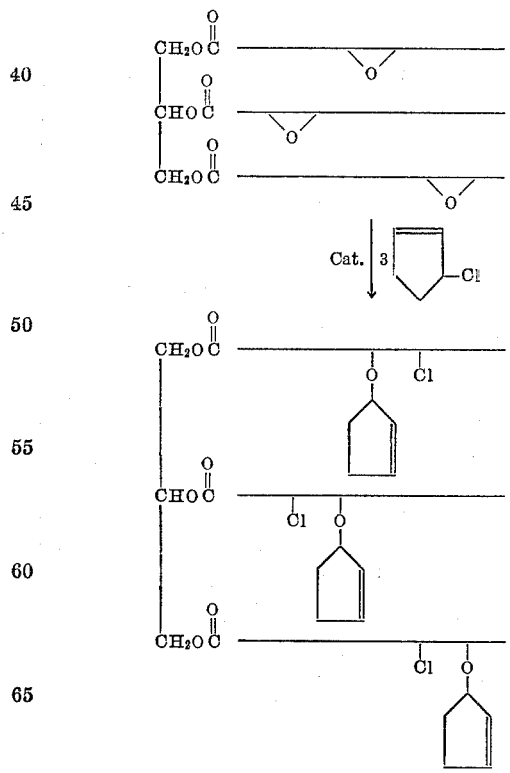

The work up of the reaction mixture is very simple. The catalyst can be removed by washing the reaction mixture with water which causes the formation of an organic and an aqueous layer. To facilitate the separation of the aqueous layer, a solvent such as petroleum ether, ethyl ether or benzene may be used. After separation of the organic layer from the aqueous layer and the removal of the solvent by distillation, the residue product is sufficiently pure for any further use.

The novel ethers of this invention are useful in the same manner as ordinary, simple ethers. They can also be employed as intermediates for the preparation of other compounds containing a cyclopentenyl ring. Additionally, these novel compounds can be used as plasticizers for vinyl resins, e.g., polyvinyl chloride. It is to be pointed out that the utility of these ethers applies to the isomeric mixtures as well as to the pure compound.

The following example will illustrate the instant invention.

EXAMPLE 1

*Reaction Product From Epoxidized Soybean Oil Flexol EPO With 3-Chlorocyclopentene*

3-chlorocyclopentene (102.5 grams, 1 mol) was added during a period of fifty minutes with stirring to a mixture of epoxidized soybean oil Flexol EPO (235 grams, 1 equivalent based on the epoxy content) and pulverized zinc chloride (2 grams), while the temperature of the exothermic reaction was maintained with a coling bath at 20°. After stirring for an additional thirty-five minutes, petroleum ether (B.P. 35–37°) and water (100 ml.) were added. The organic layer was separated by centrifuging. After another wash with water, the solvent and any possible low-boiling material were removed by heating the reaction product up to 100° at 2 mm. A clear yellow viscous product (310 grams) was obtained.

*Analysis.*—Calc'd for the Product: C, 67.5; H, 9.5; Cl, 10.5; iodine value, 76; hydrogen number 338. Found: C, 67.40; H, 9.50; Cl, 10.54; iodine value, 71.3; hydrogen number 379.

The calculated values were obtained on the basis of the following analysis of Flexol EPO: C, 71.53; H, 10.57; oxirane content, 6.8; iodine value, 0.9.

The infrared spectrum was in agreement with the assigned structure.

What is claimed is:

1. The process for the production of cyclopentenyl ethers of epoxidized vegetable oils which comprises reacting an epoxidized vegetable oil with a 3-halocyclopentene of the formula:

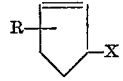

where X is selected from the group consisting of chlorine and bromine and R is selected from the group consisting of hydrogen and alkyl groups of from 1–8 carbon atoms in the presence of a Friedel-Crafts catalyst.

2. The process of claim 1 wherein the epoxidized vegetable oil is selected from the group consisting of epoxidized soybean, corn, cottonseed, safflower, sunflower, sesame, poppy seed, walnut and peanut oils.

3. The process for the production of cyclopentenyl ethers of epoxidized vegetable oils which comprises reacting an epoxidized vegetable oil with a 3-halocyclopentene of the formula:

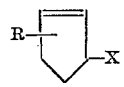

where X is selected from the group consisting of chlorine and bromine and R is selected from the group consisting of hydrogen and alkyl groups of from 1–8 carbon atoms at a temperature of from −80 to +80° C. and in the presence of from 0.05 percent to 10 percent by weight of a Friedel-Craft catalyst based on the amount of 3-halocyclopentene.

4. The process of claim 3 wherein the temperature is from −40 to +40° C.

5. A process which comprises reacting epoxidized soybean oil with 3 halocyclopentene in the presence of a Friedel-Crafts catalyst.

6. The process which comprises reacting an epoxidized soybean oil with 3-halocyclopentene in the presence of zinc chloride.

7. The process of claim 6 where the temperature is from −80 to +80° C.

8. The process of claim 6 where the temperature is from −40 to +40° C.

9. The product produced by the process of claim 1.

10. A cyclopentenyl ether of an epoxidized vegetable oil prepared by the process of claim 1 wherein the epoxidized vegetable oil has an oxirane-oxygen content of from about 2 to about 12 percent and a degree of unsaturation corresponding to an iodine value of 0 to about 10 and is of the group consisting of epoxidized soybean oil, epoxidized corn oil, epoxidized cotton seed oil, epoxidized safflower oil, epoxidized sunflower oil, epoxidized sesame oil, epoxidized poppyseed oil, epoxidized walnut oil and epoxidized peanut oil.

11. A cyclopentenyl ether of epoxidized soybean oil prepared by the process of claim 1, wherein the epoxidized soybean oil has an oxirane-oxygen content of from 3 to 8 percent and an iodine number of from 0 to 2.

12. A cyclopentenyl ether of epoxidized corn oil prepared by the process of claim 1 wherein the epoxidized soybean oil has an oxirane-oxygen content of from 3 to 8 percent and an iodine number of from 0 to 2.

13. A cyclopentenyl ether of epoxidized cottonseed oil prepared by the process of claim 1 wherein the epoxidized soybean oil has an oxirane-oxygen content of from 3 to 8 percent and an iodine number of from 0 to 2.

14. A cyclopentenyl ether of epoxidized safflower oil prepared by the process of claim 1, wherein the epoxidized safflower oil has an oxirane-oxygen content of from 3 to 8 percent and an iodine number of from 0 to 2.

15. A cyclopentenyl ether of epoxidized sunflower oil prepared by the process of claim 1 wherein the epoxidized sunflower oil has an oxirane-oxygen content of from 3 to 8 percent and an iodine number of from 0 to 2.

16. A cyclopentenyl ether of epoxidized sesame oil prepared by the process of claim 1 wherein the epoxidized sesame oil has an oxirane-oxygen content of from 3 to 8 percent and an iodine number of from 0 to 2.

17. A cyclopentenyl ether of epoxidized poppyseed oil prepared by the process of claim 1 wherein the epoxidized poppyseed oil has an oxirane-oxygen content of from 3 to 8 percent and an iodine number of from 0 to 2.

18. A cyclopentenyl ether of epoxidized walnut oil prepared by the process of claim 1, wherein the epoxidized walnut oil has an oxirane-oxygen content of from 3 to 8 percent and an iodine number of from 0 to 2.

19. A cyclopentenyl ether of epoxidized peanut oil prepared by the process of claim 1 wherein the epoxidized peanut oil has an oxirane-oxygen content of from 3 to 8 percent and an iodine number of from 0 to 2.

No references cited.